Nov. 29, 1960 G. ALFIERI 2,962,000
BRAKING TWIN-MEMBERS FOR PNEUMATIC BRAKING INSTALLATIONS
Filed March 4, 1958
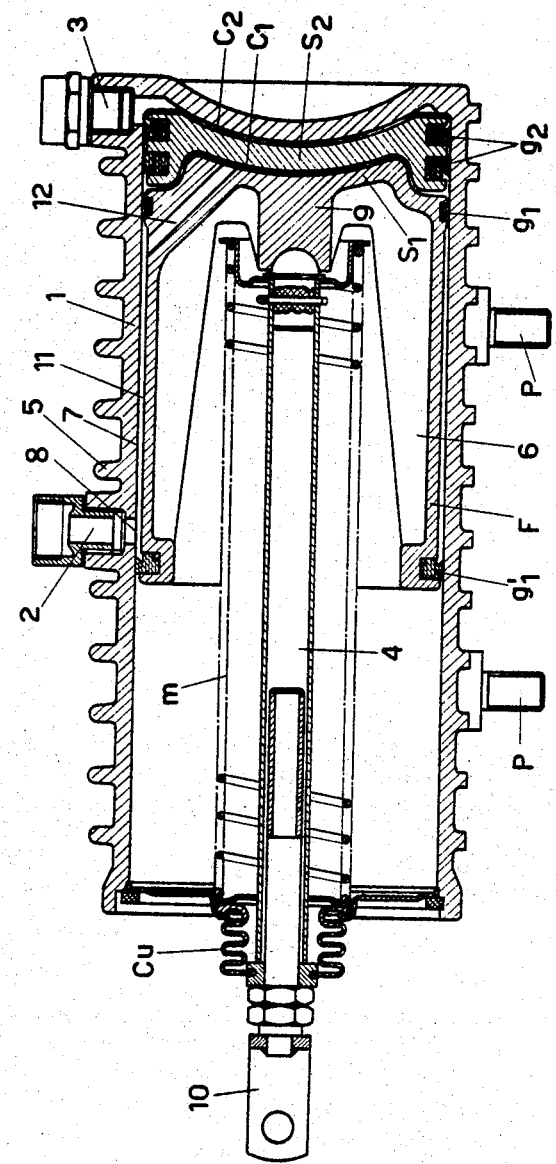

United States Patent Office 2,962,000
Patented Nov. 29, 1960

2,962,000

BRAKING TWIN-MEMBERS FOR PNEUMATIC BRAKING INSTALLATIONS

Giuseppe Alfieri, Milan, Italy, assignor to Fabbrica Italiana Magneti Marelli S.p.A., Milan, Italy, a company of Italy Filed Mar. 4, 1958, Ser. No. 719,146

Claims priority, application Italy Mar. 5, 1957

2 Claims. (Cl. 121—38)

This invention relates to pressure responsive devices, and more particularly to pressure responsive devices employed in braking installations.

It is an object of the invention to provide a pressure responsive device which responds to more than one source of a pressure medium to actuate an actuable member.

It is a further object of the invention to provide a simplified device which is susceptible to responding to a main and auxiliary supply of a pressure medium, to cause the performance of an operation.

It is still another object of the invention to provide improved apparatus for operative association with a braking installation so as to cause the functioning of the braking installation despite the failure of a main source of a pressure medium.

To achieve the above and other of its objects, the invention contemplates, in accordance with a preferred embodiment thereof, the provision of a piston and cylinder arrangement wherein the piston consists of two separate and independent members. One of these members engages a rod, by means of which piston movement is transmitted externally of the cylinder and the other piston member is adapted by means of its own movement to displace the first said piston member.

In accordance with the invention, provision is made for feeding a pressure medium in between both of said piston members and also between one of the members and an end of the associated cylinder.

It is a feature of the invention that the piston member which is positioned intermediate the other piston member and the cylinder end is a simple disc-like member having no peripheral or annular flange by which it is supported in the cylinder. In fact, the only connection between this disc-like member and the associated cylinder is one or more gaskets, the primary function of which is to effect a seal intermediate the cylinder and piston.

A further feature of the invention is the provision of a passage in one of the piston members, whereby it is possible to feed a pressure medium to a position in between said piston members.

Other objects and features of the invention, as well as advantages thereof, will be apparent from the following detailed description of a preferred embodiment, as illustrated in the accompanying drawing.

In the sole figure of the drawing, which is a longitudinal sectional view, is shown a cylinder 1, $S_1$ and $S_2$ respectively indicating first and second pistons, 2 and 3 indicating the connections for two feed lines, one for normal operation and the second for the emergency or auxiliary stage; 4 is the rod of the piston $S_1$ or the tappet for the actuation of the braking members; $m$ is a spring and $Cu$ is a bellows. The cylinder 1 supports peripheral fins 5.

The piston $S_1$ which is reinforced by ribs 6 comprises at its head a guide gasket $g_1$ while at the end of its flank F it carries a sealing gasket $g'_1$. Said piston is slidable along the internal surface 7 of the cylinder 1 and is dimensioned in such a way as to avoid sliding of the guide gasket $g_1$ during its stroke on the bore 8 of the cylinder, even for a short time interval.

At the flank of the piston $S_1$ there is provided a hole 12 that opens into the pressure chamber $C_1$, while at the central projection 9, the piston is fixedly connected with the tappet 4. The piston $S_2$ is separated from the first piston by means of the pressure chamber $C_1$; the pressure chamber of $S_2$ being indicated at $C_2$. In an emergency operation, when the control of the first piston is no longer to be effective, this chamber is fed through the connection 3 connected to the auxiliary feeding conduit.

According to the invention, the piston $S_2$ is reduced to a mere cap and its coupling with the cylinder 1 is obtained by means of the sealing gaskets $g_2$ only. In normal operation of the twin-member, the fluid passes through the connection 2, the chamber 11, and the conduit 12 into the pressure chamber $C_1$ of the piston $S_1$. Consequently, the piston will be pushed towards the left with respect to the drawing, overcoming the action of spring $m$. The tappet 4 connected rigidly with the piston S will thus be displaced and will act by its end 10 upon a lever (not shown) for actuating the brakes.

In the release stage, the chamber $C_1$ is no longer under pressure and, therefore, the spring $m$ will bring the piston $S_1$ back to its starting position.

In the auxiliary operation, the fluid will pass through the connection 3 to the pressure chamber $C_2$. The piston $S_2$ then will be pushed forward and in its movement it will drag along $S_1$. The operation of the device has been described with the hypothesis that 2 is the connection with the main feed; however it will be understood that the service may be reversed: that is, in normal operation, fluid may be introduced through the connection 3 and the conduits 2, 11, 12 may be employed for the emergency feed.

In normal or emergency operation, the gaskets $g_1$ of $S_1$ will never pass through the bore 8. Hence one will avoid the wear of the gaskets on whose efficiency that of the operation of the piston $S_1$ depends. The whole assembly may be fixed to the vehicle by means of the stud bolts P of which only two are visible in the drawing.

The invention has been described with reference to the accompanying drawing and in its particular application to the control of brakes on vehicles. It should be understood, however, that the device may be applied without any difficulty in all those cases in which the safety of operation of the members is to be attained, upon which there acts a fluid under pressure.

What is claimed is:

1. Pressure-responsive apparatus comprising a cylinder, a first piston member adjacent an end of the cylinder, a second piston member adjacent said first piston member, a rod extending axially through said cylinder and engaging the second piston member for actuation thereby, means fixed on said cylinder for the supply of a pressure medium between said piston members whereby said rod is actuated, and means operatively associated with said cylinder for the application of a pressure medium against said first piston member for displacing the latter against said second piston member to actuate said rod, said second piston member including an annular flange defining an annular clearance with the cylinder, said second piston member defining a bore opening between said piston members and connected with said clearance, the first said means opening into said clearance.

2. Apparatus as claimed in claim 1 wherein said second piston member includes an annular flange and ribs on and strengthening said flange.

References Cited in the file of this patent

UNITED STATES PATENTS

| | | |
|---|---|---|
| 427,231 | Grafton | May 6, 1890 |
| 1,142,551 | Burnhart | June 8, 1915 |
| 2,005,387 | Pelton | June 18, 1935 |
| 2,373,272 | Stelzer | Apr. 10, 1945 |
| 2,531,907 | Daubenmeyer | Nov. 28, 1950 |
| 2,570,434 | Dow et al. | Oct. 9, 1951 |
| 2,577,462 | Hackney | Dec. 4, 1951 |
| 2,649,169 | Holman | Aug. 8, 1953 |
| 2,726,738 | Fawick | Dec. 13, 1955 |
| 2,764,131 | Knights | Sept. 25, 1956 |